(12) United States Patent
Lee (10) Patent No.: US 9,388,049 B2
(45) Date of Patent: Jul. 12, 2016

(54) METHOD OF PRODUCING GRAPHENE USING SURFACTANT

(71) Applicant: RESEARCH & BUSINESS FOUNDATION SUNGKYUNKWAN UNIVERSITY, Suwon-si (KR)

(72) Inventor: Hyoyoung Lee, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 14/299,320

(22) Filed: Jun. 9, 2014

(65) Prior Publication Data
US 2014/0370274 A1 Dec. 18, 2014

Related U.S. Application Data (60) Provisional application No. 61/833,955, filed on Jun. 12, 2013.

(30) Foreign Application Priority Data

Jun. 13, 2013 (KR) .................. 10-2013-0068046
Mar. 7, 2014 (KR) .................. 10-2014-0027042

(51) Int. Cl.
*C01B 31/02* (2006.01)
*C01B 31/04* (2006.01)

(52) U.S. Cl.
CPC ........... *C01B 31/043* (2013.01); *Y10T 428/265* (2015.01)

(58) Field of Classification Search
USPC .............................. 427/372.2, 376.1
See application file for complete search history.

(56) References Cited

FOREIGN PATENT DOCUMENTS

KR 10-2013-0011099 A 1/2013
KR 10-2013-0026687 A 3/2013

OTHER PUBLICATIONS

Compton et al "Graphene Oxide, Highly Reduced Graphene Oxide, and Graphene: Versatile Building Blocks for Carbon_Based Materials" Small, 6 (2010) p. 711-723.*
Some, Surajit, et al. "Binol salt as a completely removable graphene surfactant." Chemical Communications 48.62 (2012): (8 pages).

* cited by examiner

*Primary Examiner* — Archene Turner
(74) *Attorney, Agent, or Firm* — NSIP Law

(57) ABSTRACT

A method of producing reduced graphene oxide and reduce graphene oxide produced by the method are provided. The method of producing reduced graphene oxide involves forming a graphene oxide-dispersed solution comprising graphene oxide and a surfactant that comprises at least two aromatic functional groups, reducing the graphene oxide-dispersed solution to obtain a layered structure of reduced graphene oxide comprising the at least two aromatic functional groups, and dispersing the layered structure of reduced graphene oxide in a solvent to produce a multi-layered reduced graphene oxide.

16 Claims, 11 Drawing Sheets

METHOD OF PRODUCING GRAPHENE USING SURFACTANT

CROSS-REFERENCE TO RELATED APPLICATIONS

This application claims the benefit under 35 U.S.C. §119 (a) of U.S. application Ser. No. 61/833,955 filed on Jun. 12, 2013 and Korea Patent Application No. 10-2014-0027042 filed on Mar. 7, 2014, which claimed the benefit of Korean Patent Application No. 10-2013-0068046 filed on Jun. 13, 2013, in the Korean Intellectual Property Office, the entire disclosure of all of which is incorporated herein by reference for all purposes.

BACKGROUND

1. Field

The following description relates to a method of producing graphene, a method of producing reduced graphene oxide using a surfactant containing an aromatic functional group, and reduced graphene oxide and nanostructures produced by such methods.

2. Description of Related Art

Graphene has attracted great interest in the scientific community for its typical physical properties and potential applicability in the fields of nanoelectronics, energy storage materials, polymer composition materials, and sensing technologies. Among the techniques that have been developed to produce high-quality graphene sheets in large numbers, mechanical exfoliation has been principally used to produce pure graphene sheets for basic science researches. However, the technique of mechanical exfoliation is not suitable for the mass production of graphene.

Accordingly, developing an alternative production method, which enables large-scale synthesis of graphene sheets, still remains a challenge. In addition, the hydrophobicity of graphene nanosheets and the tendency of graphene nanosheets to be agglomerated within a solvent are some of the factors hindering the development of an alternative graphene production method, restricting the potential versatile applicability of graphene. Recently, it has been reported that a large number of graphene sheets can be produced by reducing exfoliated graphene oxide. Also, it has been reported that since the graphene sheet can be stabilized by an amphiphilic polymer and a monomer surfactant, a stable graphene-dispersed solution is formed under the presence of such a surfactant. However, since it is very difficult to remove the surfactant from the dispersed solution after the formation of the stable graphene-dispersed solution under the presence of the surfactant, it is generally not desirable to use a surfactant in the production of graphene. A conventional functionalized graphene sheet has been produced by thermal expansion of graphene oxide without using a surfactant, and a stable dispersed solution of graphene chemically modified by alkylamine has also been reported. However, the former thermal method has a restriction in terms of a solution process, and the latter amine doping method has a restriction in terms of its application due to the purity of graphene.

Accordingly, in functionalization of the graphene sheet for application to devices, improving the dispersibility and the self-assembly characteristics of the graphene nanosheet has been the key issues. However, despite the fact that aromatic organic molecules are reagents commonly used in the organic chemistry, there has been no report on non-shared functionalization of the graphene sheet through π-π interaction using aromatic organic molecules. Also, there has been no report on removing a surfactant after the use thereof, in surface attachment or processing of graphene.

In this regard, Korean Patent Application Publication No. 10-2013-0011099 describes a graphene-dispersed solution and a producing method thereof, but still has the foregoing drawbacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of producing reduced graphene oxide, the method comprising: forming a graphene oxide-dispersed solution comprising graphene oxide and a surfactant that comprises at least two aromatic functional groups; reducing the graphene oxide-dispersed solution to obtain a layered structure of reduced graphene oxide comprising the at least two aromatic functional groups; and dispersing the layered structure of reduced graphene oxide in a solvent to produce a multi-layered reduced graphene oxide.

The at least two aromatic functional groups each may include a member selected from the group consisting of a naphthyl group, an anthracenyl group, a pyrenyl group, a tetrahydropyrenyl group and combinations thereof.

The surfactant may include a salt containing two connected naphthyl groups, a salt containing two connected anthracenyl groups, a salt containing two connected pyrenyl groups, a salt containing two connected tetrahydropyrenyl groups, or derivatives thereof.

The reducing of the graphene oxide-dispersed solution may be performed by adding a reducing agent to the graphene oxide-dispersed solution.

The reducing agent may include a member selected from the group consisting of sodium hydroxide, calcium hydroxide, ammonium hydroxide, sodium borohydride, hydrazine, hydrogen iodide, hydrogen sulfide, dimethyl hydrazine, hydroquinone, sulfuric acid, aluminum powder and combinations thereof.

The general aspect of the method may further include, after the dispersing of the layered structure of reduced graphene oxide in the solvent, washing and drying the layered structure of reduced graphene oxide by using an aqueous solvent, an organic solvent or a combination thereof.

The organic solvent may include a member selected from the group consisting of acetone, methylethylketone, methyl alcohol, ethyl alcohol, isopropyl alcohol, butyl alcohol, ethylene glycol, poly ethylene glycol, tetrahydrofuran, dimethyl sulfoxide, dimethyl formamide, dimethyl acetamide, N-methyl pyrrolidone, hexane, cyclohexane, toluene, xylene, chloroform, dichlorobenzene, dimethylbenzene, trimethylbenzene, pyridine, methylnaphthalene, nitromethane, dichloromethane, acetonitrile, octadecylamine, aniline and combinations thereof.

In another general aspect, there is provided a reduced graphene oxide produced by the above method.

In yet another general aspect, there is provided a method of producing reduced graphene oxide, the method involving: forming a reaction mixture comprising graphene oxide, a reducing agent and a surfactant comprising at least two aromatic functional groups in its molecular structure, reducing the graphene oxide dispersed in the reaction mixture to obtain reduced graphene oxide comprising the surfactant, removing the surfactant from the obtained reduced graphene oxide to obtain a multi-layered reduced graphene oxide.

The surfactant may include a member selected from the group consisting of a naphthyl group, an anthracenyl group, a pyrenyl group, a tetrahydropyrenyl group and combinations thereof in its molecular structure.

The surfactant may include a 1,1'-bi-2-naphthol, a binol salt or a binol derivative.

The reducing of the graphene oxide may include adding a reducing agent to the reaction mixture and heating the reaction mixture to a temperature greater than 40° C.

The reducing agent may include a member selected from the group consisting of sodium hydroxide, calcium hydroxide, ammonium hydroxide, sodium borohydride, hydrazine, hydrogen iodide, hydrogen sulfide, dimethyl hydrazine, hydroquinone, sulfuric acid, aluminum powder and combinations thereof.

The removing of the surfactant may include dispersing a layered structure of reduced graphene oxide comprising the surfactant in an aqueous solvent, washing and drying the layered structure of reduced graphene oxide to remove the surfactant.

The layered reduced graphene oxide may include the surfactant has an average interlayer distance between 13 to 15 Å before the removing of the surfactant.

The washing may be performed using a solvent comprising a member selected from the group consisting of acetone, methylethylketone, methyl alcohol, ethyl alcohol, isopropyl alcohol, butyl alcohol, ethylene glycol, poly ethylene glycol, tetrahydrofuran, dimethyl sulfoxide, dimethyl formamide, dimethyl acetamide, N-methyl pyrrolidone, hexane, cyclohexane, toluene, xylene, chloroform, dichlorobenzene, dimethylbenzene, trimethylbenzene, pyridine, methylnaphthalene, nitromethane, dichloromethane, acetonitrile, octadecylamine, aniline and combinations thereof.

The multi-layered reduced graphene oxide may have a C/O ratio of 13 or greater and an average interlayer distance between 3 to 4 Å.

In another general aspect, a multi-layered reduced graphene oxide produced according to the above method is provided, in which the multi-layered reduced graphene oxide has a C/O ratio of 13 or greater and an average interlayer distance between 3 to 4 Å.

In yet another general aspect, a reduced graphene oxide nanostructure includes a plurality of reduced graphene oxide sheets having an interlayer distance of 13 Å or greater, and a surfactant layer disposed between the plurality of reduced graphene oxide sheets, the surfactant layer including an organic compound comprising an aromatic functional group and a polar functional group.

The aromatic functional group may include a member selected from the group consisting of a naphthyl group, an anthracenyl group, a pyrenyl group, a tetrahydropyrenyl group and combinations thereof.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the present disclosure, the terms "connected to" or "coupled to" are used to designate a connection or coupling of one element to another element and include both a case where an element is "directly connected or coupled to" another element and a case where an element is "electronically connected or coupled to" another element via still another element.

The term "on" that is used to designate a position of one element with respect to another element includes both a case that the one element is adjacent to the another element and a case that any other element exists between these two elements.

The term "comprises or includes" and/or "comprising or including" used in the document means that one or more other components, steps, operations, and/or the existence or addition of elements are not excluded in addition to the described components, steps, operations and/or elements.

The terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party.

The term "step of" does not mean "step for."

The term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

The description "A and/or B" means "A or B, or A and B."

The term "graphene" refers to multiple carbon atoms are bonded to one another through covalent bond, thereby forming polycyclic aromatic molecules, and the carbon atoms bonded through the covalent bond form a six (6) circular ring as a basic repeat unit, but may further include five (5) and/or seven (7) circular rings. A graphene sheet may be a monolayer sheet of covalently bonded carbon atoms having $sp^2$-hybridization to form a hexagonal honeycomb lattice, but may not be limited thereto. A graphene sheet may have various structures, and the structures may vary depending on a content of the 5 and/or 7 circular rings that may be contained in the graphene molecule. Depending on the purity of the graphene, a graphene sheet may further include other impurities as well as lattice defects. Furthermore, if the sheet formed of the graphene is a monolayer, it may be stacked on one another thereby forming multiple layers, and a side end part of the graphene sheet may be saturated with hydrogen atoms, but may not be limited thereto.

The terms "graphene oxide" may be abbreviated as "GO." The graphene oxide may include a molecular structure in which a functional group containing oxygen such as a carboxyl group, a hydroxyl group or an epoxy group is bonded on monolayer graphene, but the molecular structure is limited thereto.

The term "reduced graphene oxide" refers to graphene oxide that underwent a reduction process so that an oxygen rate of the graphene oxide is reduced. The term "reduced graphene oxide" may be abbreviated as "rGO," without being limited thereto.

Hereinafter, the various examples are described in detail; however, the present disclosure is not limited thereto.

In accordance with a first aspect, there is provided a method of producing reduced graphene oxide. The method may involve producing a reaction mixture. The reaction mixture may be a graphene oxide-dispersed solution including graphene oxide dispersed in a solvent and a surfactant that contains at least two aromatic functional groups in its molecular structure. The method may further involve reducing the graphene oxide-dispersed solution to obtain a layered structure of reduced graphene oxide, which contains a surfactant having at least two aromatic functional groups in its molecular formula, and dispersing the layered structure of reduced graphene oxide in an aqueous solvent to produce a multi-layered reduced graphene oxide without the surfactant.

The surfactant may be an amphiphilic compound having a non-polar portion and a polar portion in its molecular structure. The non-polar portion may comprise an aromatic functional group or two or more 5 or 6-membered carbon rings that are fused together. The rings may form a planar structure and $sp^2$ hybridization at each carbon atoms in the carbon rings. The polar portion may include a polar functional group such as hydroxyl group, carboxylic group, carbonyl group, and the like. However, the surfactant is not limited thereto.

In accordance with an example of a method of producing reduced graphene oxide, in the molecular structure of the surfactant, each of the at least two aromatic functional groups may independently include a member selected from the group consisting of a naphthyl group, an anthracenyl group, a pyrenyl group, a tetrahydropyrenyl group and combinations thereof; however, the aromatic functional group is not limited thereto.

In accordance with an example of a method of producing reduced graphene oxide, to produce the GO, any method known in the art of the present disclosure may be used without limitation. For example, the GO may be produced from natural graphite powders by modified Hummers and the Offenman methods, which use sulfuric acid, potassium permanganate, hydrochloric acid, and nitric acid, but may not be limited thereto. In general, the GO is produced by oxidation of graphene, by which oxygen atoms are introduced into the graphene, and thereby, forming a functional group containing oxygen such as a carboxyl group, a hydroxyl group or an epoxy group. The functional group expands a gap between graphene monolayers to enable each of the graphene layers to be easily separated. In addition, since the GO contains the oxygen-containing functional group, it has a hydrophilic property. As such, the GO can be more easily dispersed in water.

In an example of a method of producing reduced graphene oxide, the surfactant containing the at least two aromatic functional groups is absorbed onto a surface of graphene or graphene oxide through interaction with π-electrons having a graphene structure to be self-assembled in a regular microstructure between graphene or graphene oxide layers, and thereby, suppressing the agglomeration of the graphene or graphene oxide layers.

In an example of a method of producing reduced graphene oxide, the GO-dispersed solution may be formed by adding the GO to a solvent, or adding the GO to a solvent, and then, heating, stirring or sonicating the solution; however the method is not limited thereto.

In an example of a method of producing reduced graphene oxide, the surfactant containing the at least two aromatic functional groups may include a salt containing two connected naphthyl groups, a salt containing two connected anthracenyl groups, a salt containing two connected pyrenyl groups, a salt containing two connected tetrahydropyrenyl groups, or derivatives thereof, for example, a binol (a 1,1'-bi-2-naphthol) or a binol derivative; however the method is not limited thereto.

In an example of a method of producing reduced graphene oxide, two naphthalene moieties of the binol salt have affinity with graphite and a basal plane of graphene through π-stacking. In addition, since the binol salt has weak π-π interaction with graphene, it can be completely removed by washing without affecting the characteristics of graphene or the GO. By utilizing the characteristic of the binol salt, a stable dispersed aqueous solution of a graphene sheet may be produced while using a sodium salt of binol, which is an aqueous binol derivative, as a stabilizer.

In an example of a method of producing reduced graphene oxide, the binol derivative provides a significantly long interlayer distance to the GO by using its excellent dispersion force in water and can be completely removed after finishing its function as a surfactant.

In an example of a method of producing reduced graphene oxide, to reduce the GO-dispersed solution, any reduction method known in the art of the present disclosure may be used without limitation. For example, the reduction of the GO-dispersed solution may be performed by a method consisting of adding a reducing agent, calcining, using of microwaves, and combinations thereof, but may not be limited thereto.

In an example of a method of producing reduced graphene oxide, the reducing agent may include a member selected from the group consisting of sodium hydroxide (NaOH), potassium hydroxide (KOH), ammonium hydroxide ($NH_4OH$), sodium borohydride ($NaBH_4$), hydrazine ($N_2H_4$), hydrogen iodide (HI), hydrogen sulfide ($H_2S$), dimethyl hydrazine, hydroquinone, sulfuric acid ($H_2SO_4$), aluminum powder and combinations thereof, but may not be limited thereto. For example, the reducing agent may be hydrazine hydrate or a mixture solution of hydrazine hydrate and ammonia, but may not be limited thereto. The reduction method of GO using the hydrazine hydrate can most effectively reduce materials containing oxygen within the GO.

In an example of a method of producing reduced graphene oxide, the reduction of the GO-dispersed solution may be performed by additional treatment after the addition of the reducing agent, but may not be limited thereto. For example, the reduction of the GO-dispersed solution may include heating the solution to approximately 120° C. or lower after the addition of the reducing agent, but may not be limited thereto. For example, the reduction of the GO-dispersed solution may include heating the solution to approximately 90° C. or lower, approximately 100° C. or lower, approximately 110° C. or lower, or approximately 120° C. or lower, but may not be limited thereto.

In an example of a method of producing reduced graphene oxide, in the layered structure of the rGO containing the at least two aromatic functional groups, the surfactant containing the at least two aromatic functional groups is inserted between the layers of the rGO layered structure, and thereby, increasing the graphene interlayer distance.

In an example of a method of producing reduced graphene oxide, the production of the multi-layered rGO may further include washing and drying the layered structure of the rGO containing the at least two aromatic functional groups by using an aqueous solvent and/or an organic solvent, after dispersing the layered structure of the rGO in an aqueous solvent, but may not be limited thereto. The surfactant can be removed from the layered structure of the rGO through the washing.

In an example of a method of producing reduced graphene oxide, for the aqueous solvent and/or the organic solvent, any aqueous and/or organic solvent known in the art of the present disclosure may be used without limitation. For example, the organic solvent may include a member selected from the group consisting of acetone, methylethylketone, methylalcohol, ethylalcohol, isopropylalcohol, butylalcohol, ethyleneglycol, polyethyleneglycol, tetrahydrofuran, dimethylsulfoxide, dimethylformamide, dimethylaceteamide, N-methylpyrrolidone, hexane, cyclohexane, toluene, xylene, chloroform, dichlorobenzene, dimethylbenzene, trimethylbenzene, pyridine, methylnaphthalene, nitromethane, dichloromethane, acetonitrile, octadecylamine aniline, dimethylsulfoxide, and combinations thereof, but may not be limited thereto. The aqueous solvent may include, for example, water, but may not be limited thereto.

In an example of a method of producing reduced graphene oxide, the drying is not specifically limited if it is carried out at a room temperature or higher. For example, the drying may be carried out in a vacuum oven of approximately 80° C. for approximately 24 hours, but may not be limited thereto.

In an example of a method of producing reduced graphene oxide, in the process of washing and drying the layered structure of the rGO containing the at least two aromatic functional groups by using an aqueous solvent and/or an organic solvent after dispersing the layered structure of the rGO in an aqueous solvent, the surfactant containing the at least two aromatic functional groups between the layers of the layered structure of the rGO containing the at least two aromatic functional groups is removed, while the graphene interlayer distance of the multi-layered rGO may be reduced, compared to the layered structure of the rGO containing the at least two aromatic functional groups.

In an example of a method of producing reduced graphene oxide, if the multi-layered rGO is formed on a $SiO_2$ substrate by a drop casting method, thickness and sheet resistance of a pellet of the multi-layered rGO may be reduced, compared to the layered structure of the rGO containing the at least two aromatic functional groups, as a result of the removal of the surfactant containing the at least two aromatic functional groups between the layers of the layered structure of the rGO containing the at least two aromatic functional groups.

In accordance with a second aspect, there is provided rGO produced by the method according to the first aspect.

The present example omits the detailed descriptions overlapping with those of the above-described example, but in spite of the omission of the description, the descriptions of the above-described example embodiment can be identically applied to the present example embodiment.

Hereinafter, the example of a method of producing reduced graphene oxide is described in more detail with reference to Examples. However, the Examples are merely illustrative to facilitate understanding of the example embodiments, and the present disclosure is not limited to the Examples.

EXAMPLES

Materials

Natural graphite (Bay Carbon, SP-1 graphite), sulfuric acid (95-97%), hydrogen peroxide (30 wt %), potassium permanganate, sodium nitrate, hydrazine tetrahydrofuran, hydrazine hydrate (35%), s-binol, and sodium hydroxide were purchased from commercial sources and used as purchased.

Characterization

All X-ray photoelectron spectroscopy (XPS) measurements were performed at 100 W by SIGMA PROBE (ThermoVG, U.K.) using a solid-color Al-Kα X-ray source. Powder X-ray diffraction (XRD) patterns were obtained by using the D8-Advance device (German) and Cu—K α radiation. Thermal properties of all samples were analyzed by TGA 1000 plus (Polymer Laboratories) using thermogravimetric analysis (TGA). Atomic force microscope (AFM) was carried out at a room temperature by using the SPA400 device (Seiko Instrument Industry Co.) including a SPI-3800 controller. All ultraviolet-visible (UV-vis) absorption spectra were recorded by using a double-beam UV-1650PC spectrophotometer (Shimadzu).

Production of Graphene Oxide

Graphene oxide (GO) was prepared from natural graphite powders by using sulfuric acid, potassium permanganate, and sodium nitrate through modified Hummers and Offenman methods.

Production of Reduced Graphene Oxide Containing Binol Salt 15 mg of GO was dispersed in 10 mL of deinoized water. A 60 mg portion of binol and NaOH (3 equiv.) were added thereto, and then, the solution was stirred at a room temperature to produce a completely dispersed solution. Subsequently, a temperature of the dispersed solution was adjusted to be approximately 5° C. to approximately 10° C. After hydrazine hydrate (0.75 mL) was added to the dispersed solution, the solution was heated for 30 minutes to approximately 100° C. The product obtained from the heating was filtered, and then, washed several times with water. The product was dried in a vacuum oven at 80° C. for 24 hours so that reduced graphene oxide (rGO) containing a binol salt was obtained. The obtained rGO containing the binol salt was completely dispersed in water. The rGO containing the binol salt, which was dispersed in water, was filtered by using the Buchner funnel. After the rGO containing the binol salt on the filtering Buchner funnel was washed several times with water, ethanol, and acetone, it was dried in a vacuum oven at 80° C. for 24 hours so that rGO was obtained.

Production of Controlled Sample of Reduced Graphene Oxide 15 mg of GO was dispersed in 10 mL deionized water. While a temperature of the solution was maintained at approximately 5° C. to approximately 10° C., NaOH (3 equiv.) was added thereto, and then, the solution was stirred at a room temperature so that the completely dispersed solution was produced. After hydrazine hydrate (0.75 mL) was added to the dispersed solution, the solution was heated for 30 minutes to approximately 100° C. The product obtained from the heating was filtered, washed several times with water, and then, dried in a vacuum oven at 80° C. for 24 hours so that the controlled sample (rGO) was obtained.

Results and Study

In accordance with the present Examples, a stable dispersed aqueous solution of a graphene sheet can be produced through exfoliation/in situ reduction of GO, under the presence of a binol salt as a surfactant for stabilization, and the binol salt, which is the surfactant, can be completely removed without affecting the characteristics of the graphene sheet.

In accordance with the present Examples, since two naphthalene moieties of binol molecules have affinity with graphite and a basal plane of graphene through π-stacking, an aqueous binol derivative and a binol sodium salt were used as surfactants to produce the stable dispersed aqueous solution of the graphene sheet. The binol derivative provided a significantly long interlayer distance by using the excellent dispersion force in water, and was completely removed after it finished its function as a surfactant. X-ray photoelectron spectroscopy (XPS), powder X-ray diffraction (XRD) analysis, thermogravimetric analysis (TGA), and ultraviolet-visible (UV-visible) spectra were used for the characterization of the materials.

First, the GO sheet was synthesized from graphite powders by using the modified Hummers method (Bay carbon, SP-2) and purified as conventionally reported. Binol and sodium hydroxide were mixed within the GO solution so that a completely dispersed aqueous solution was produced. A large amount of hydrazine hydrate was added to the dispersed aqueous solution at approximately 5° C. to approximately 10° C., and subsequently, the solution was subject to heat treatment at approximately 100° C. for 15 to 20 minutes. Since the hydrazine hydrate was added at a relatively low temperature, it slowed down the reduction rate of the GO in formation of the uniform graphene sheet containing the binol salt mixture (the rGO containing the binol salt of FIG. 1A). The rGO containing the binol salt, which was produced in accordance with the above-described process, was dispersed in an aqueous solution in a concentration of 1.5 mg/mL or lower (FIG. 1B). The binol salt of the rGO containing the binol salt could be completely removed through washing with water and an organic solvent, due to the weak π-π interaction between the binol salt and the graphene resulting from the molecular structure of the binol salt, without affecting the characteristics of the rGO nanosheet.

Figure 1A:
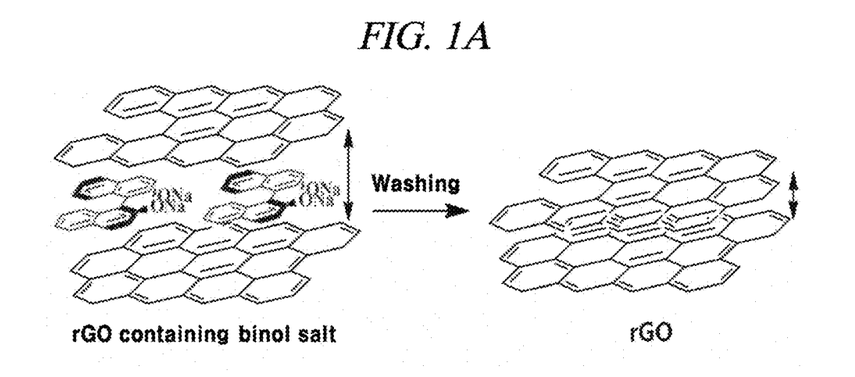
FIG. 1A is a schematic diagram illustrating molecular structures of rGO containing a binol salt and the molecular structure of rGO as produced in accordance with an example method of the present application.
Figure 1B:
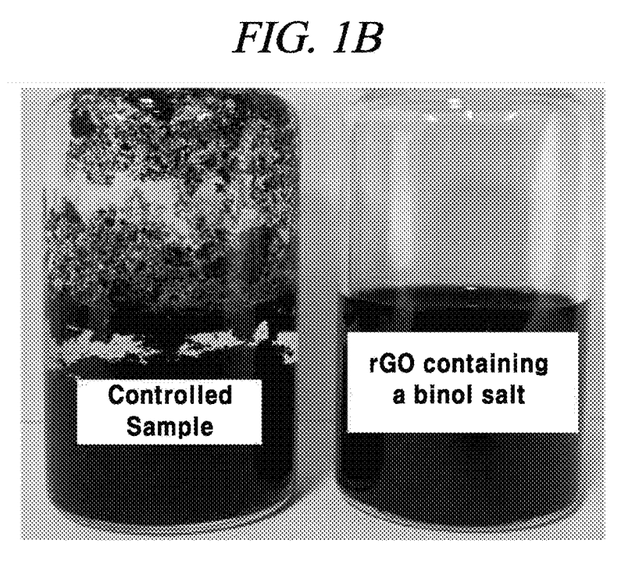
FIG. 1B is a photographic image showing a controlled sample of rGO (left) dispersed in water and an example of rGO (right) containing a binol salt produced in accordance with an example method that is dispersed in water.
Figure 2:
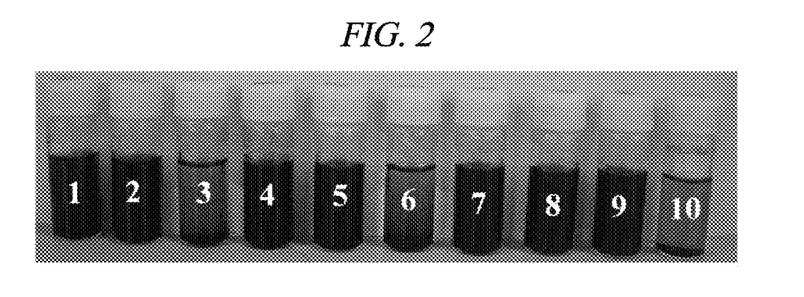
FIG. 2 is a photographic image showing results of a solubility test (1 mg/mL) for an example of rGO containing a binol salt as produced by sonication for 2 hours in accordance with an example method, with respect to various solvents.

FIG. 1A illustrates a possible process by which rGO containing the binol salt according to an example method may be turned into rGO. In this example, binol was used as the surfactant. After rGO containing the binol salt is collected from a reaction involving the reduction of graphene oxide, the rGO containing the binol salt may be dispersed in water, which may separate some sheets of reduced graphene oxides and layers of binol salts therebetween. The dispersed rGO containing binol salt may be washed with water, ethanol, acetone, alcohols, ketones and/or other aqueous or organic solvents to washout the binol salts. Also, the rGO containing the binol salt may be re-dispersed in various organic solvents (FIG. 2). FIG. 2 is a photograph showing results of dissolution tests (1 mg/mL) for the rGO containing the binol salt with respect to various solvents prepared by sonication for 2 hours according to the present Examples. The photograph of the rGO containing the binol salt, which was dispersed in the various solvents, was taken after one week from the production of the rGO. The solvents used for the dissolution tests were isopropyl alcohol (1), acetonitrile (2), toluene (3), dimethylsulfoxide (4), dimethylformamide (5), p-xylene (6), N-methylpyrrolidone (7), tetrahydrofuran (8), ethanol (9), and dichloromethane (10).

Figure 3A:
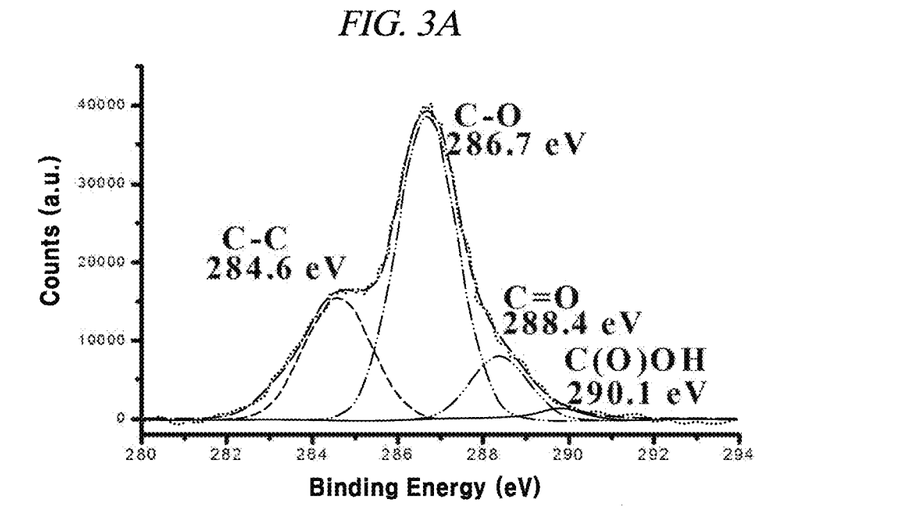
FIG. 3A is a C1s XPS spectrum of GO produced in accordance with an example of a method of producing graphene.
Figure 3B:
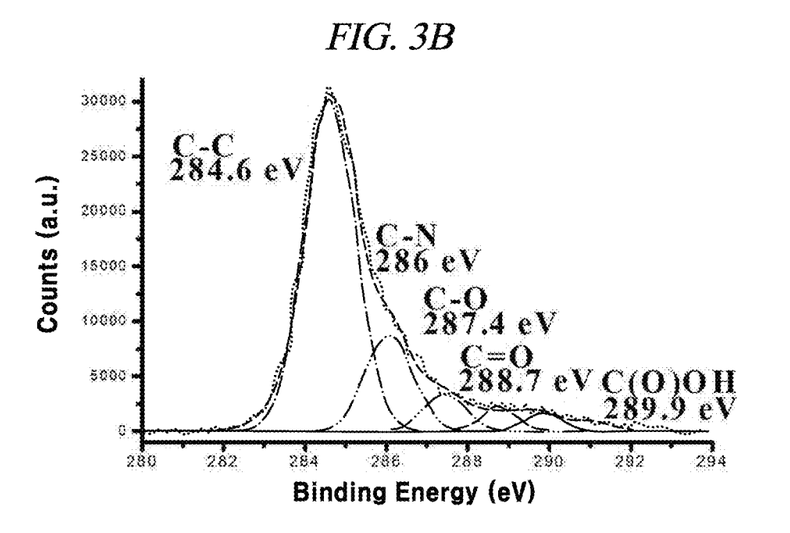
FIG. 3B is a C1s XPS spectrum of rGO containing a binol salt produced in accordance with an example of a method of producing graphene.
Figure 3C:
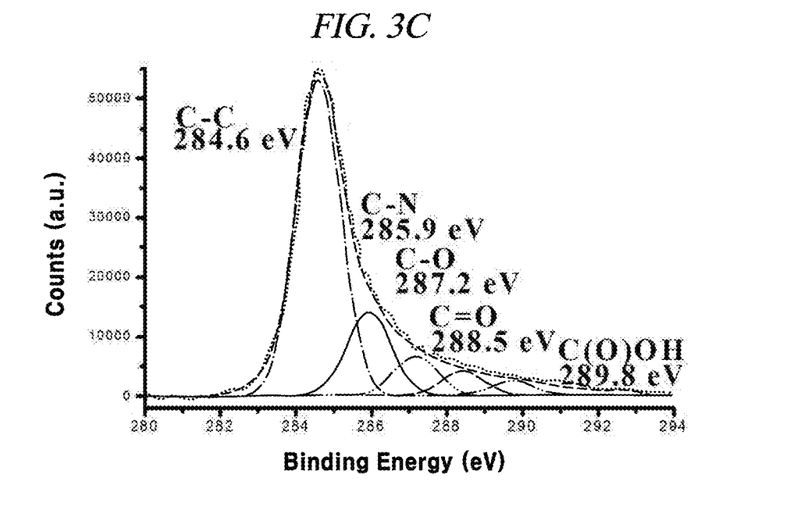
FIG. 3C is a C1s XPS spectrum of rGO produced in accordance with an example of a method of producing graphene.
Figure 3D:
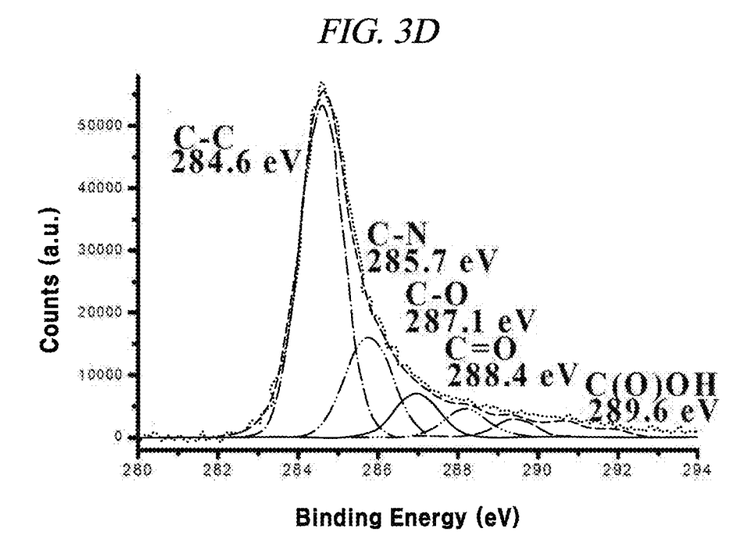
FIG. 3D is a C1s XPS spectrum of a controlled sample of rGO.
Figure 4:
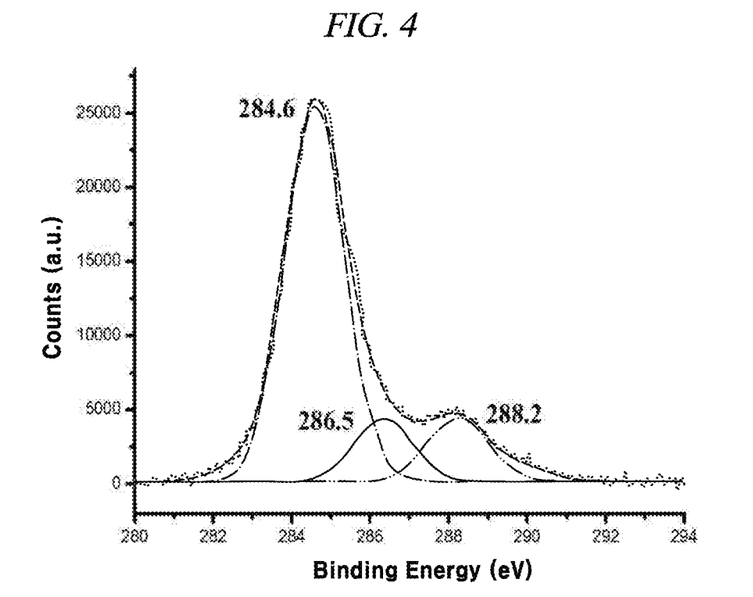
FIG. 4 is a high-resolution C1s XPS spectrum of a binol salt produced in accordance with an example of a method of producing graphene.

To analyze the rGO containing the binol salt and the rGO, X-ray photoelectron spectroscopy (XPS) was used. The C1s XPS spectrum (FIG. 3A) of the GO clearly showed a remarkable degree of oxidation with respect to the four (4) components corresponding to carbon atoms of different functional groups, i.e., carbons (284.6 eV) of a non-oxygenated ring, carbons (286.7 eV) in C—O bond, carbons (C═O, 288.4 eV) of a carbonyl group, and carbons [C(O)OH, 290.1 eV] of carboxylate. However, with respect to the identical oxygen functional groups corresponding to the GO, the XPS spectra (FIG. 3B and FIG. 3C) of the rGO containing the binol salt and the rGO exhibited much narrower peak density, which indicates significant de-oxygenation by the reduction process. In addition, there was an additional component of the area of 285.7 eV to 286.0 eV corresponding to carbons of C—N bond, which was formed from insertion of nitrogen into the system. In the XPS data, the rGO sample containing the binol salt exhibited the characteristic peaks at 1071.7 eV(Na 1s) and 495.9 eV(Na KLL), and the peaks did not generally appear in the XPS spectra of the other samples. Based on the analysis of the XPS, it was identified that the produced GO has a very high oxygen atom percent (C/O=2.2). To the contrary, the C/O ratio of the rGO containing the binol salt and the C/O ratio of the rGO were 6.8 and 13.9, respectively. The C/O ratio (4.9) of the produced binol salt was very low (FIG. 4). The C/O ratio of the rGO containing the binol salt was affected by the presence of the binol salt. However, after the binol salt was completely removed, the C/O ratio (13.9) of the produced rGO was increased. In order to identify a level of the reduction, a controlled experiment was carried out without the binol salt. The XPS data exhibit that the C/O ratio of the controlled sample was 14.2 (FIG. 3D), which is significantly close to the C/O ratio of the rGO. According to the XPS data, it was concluded that the rGO produced by the method of the example embodiments is identified to correspond to high-quality rGO containing much less oxygen.

Figure 5A:
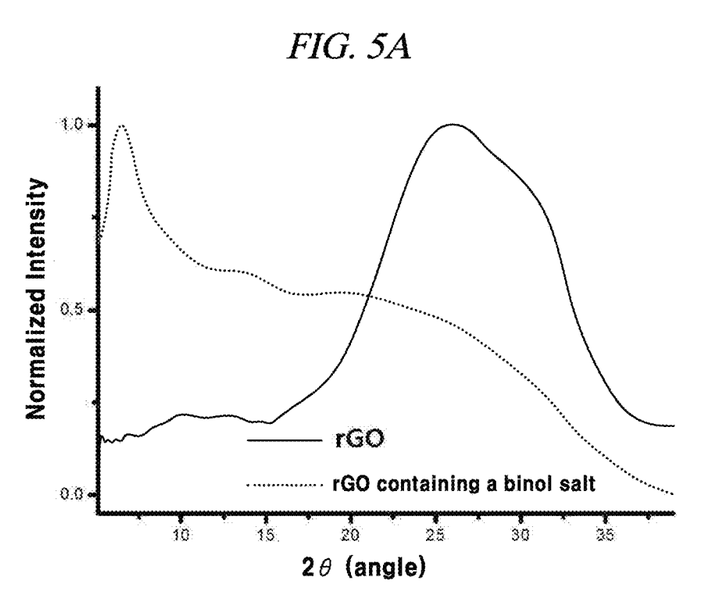
FIG. 5A is a graph illustrating powder XRD patterns of rGO (dotted line) containing a binol salt and rGO (solid line) in accordance with an example of a method of producing graphene.
Figure 5B:
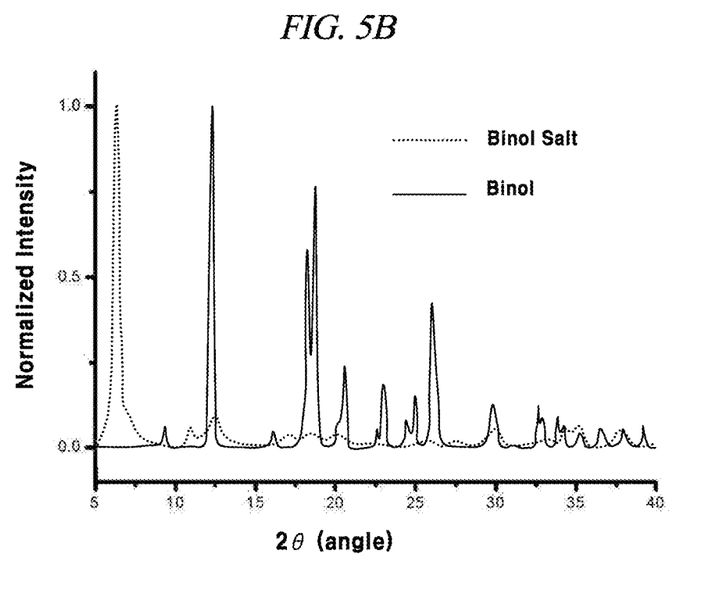
FIG. 5B is a graph illustrating powder XRD patterns of a binol salt (dotted line) and binol (solid line) in accordance with an example of a method of producing graphene.
Figure 6:
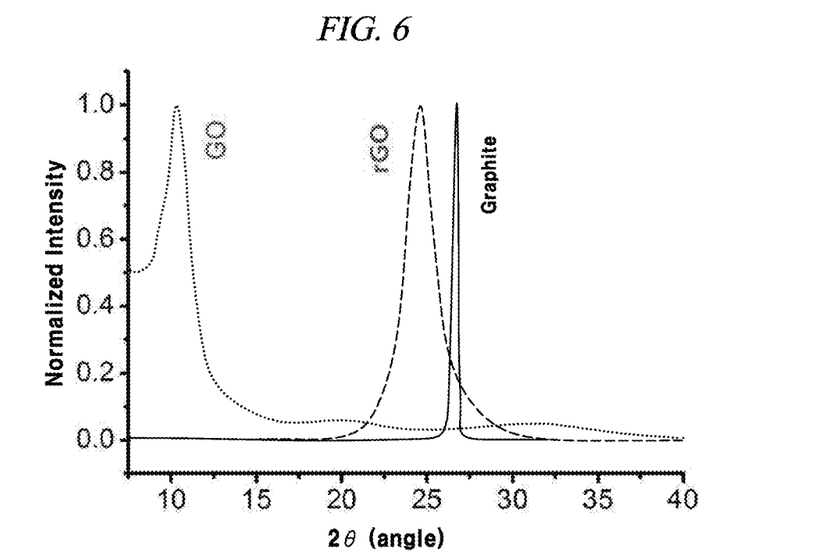
FIG. 6 is a graph illustrating XRD patterns of GO in accordance with an example embodiment, rGO as a controlled sample, and graphite.

The graphene interlayer distances of the rGO containing the binol salt and the rGO were identified by using the powder X-ray diffraction (XRD) patterns (FIG. 5A and FIG. 5B). A 2 θ peak of the graphite powders was 26.71°, which indicates that the interlayer distance of the graphite was 3.34 Å (FIG. 6). The produced GO exhibited the 2 θ peak at 10.27°, which indicates that the graphite was completely oxidized to be GO so that the interlayer distance became 8.60 Å (FIG. 6). In addition, XRD patterns of binol and a sodium salt of binol were measured (FIG. 5B). While the binol exhibited various 2 θ peaks, the binol salt exhibited a sharp peak at 6.2°, which indicates that the interlayer distance of the binol salt was 14.24 Å. The XRD pattern of the rGO containing the binol salt exhibited the 2 θ peak at 6.5°, which indicates that the interlayer distance was 13.6 Å (FIG. 5A). Accordingly, from the XRD pattern of the rGO containing the binol salt, it is believed that the interlayer distance was increased up to 13.6 Å due to the presence of the binol salt between the layers of the rGO, and is significantly identical to the interlayer distance of the binol salt. However, when the rGO containing the binol salt was washed, a typically wide peak close to 25.5° was observed, which indicates that the interlayer distance of the rGO was 3.49 Å. The rapid shift of the 2 θ peak from the rGO containing the binol salt to the rGO indicates the decrease of the interlayer distance from 13.6 Å to 3.49 Å, and shows the complete removal of the binol salt from the rGO sample containing the binol salt. Upon comparing with the XRD patterns of the GO and the rGO powders, the 2 θ peak shifting from 10.27° to 25.5° shows that the interlayer distance of the rGO was substantially decreased. The interlayer distance of the rGO was 3.49 Å, which is significantly close to the interlayer distance (3.34 Å) of the graphite powders. The 2 θ peak of the rGO was more narrower than that observed by the inventors of the present disclosure in their previous researches, and the narrow peak would be a result of the properly arranged two-dimensional structure of the rGO sheet. From the long interlayer distance (13.6 Å) of the XRD data, it was identified that the rGO containing the binol salt also contains rGO together with the binol salt. After the rGO containing the binol salt was washed with the various solvents, the interlayer distance was decreased, which indicates the complete removal of the binol salt and re-formation of a typical rGO layer stack of graphite.

Figure 7:
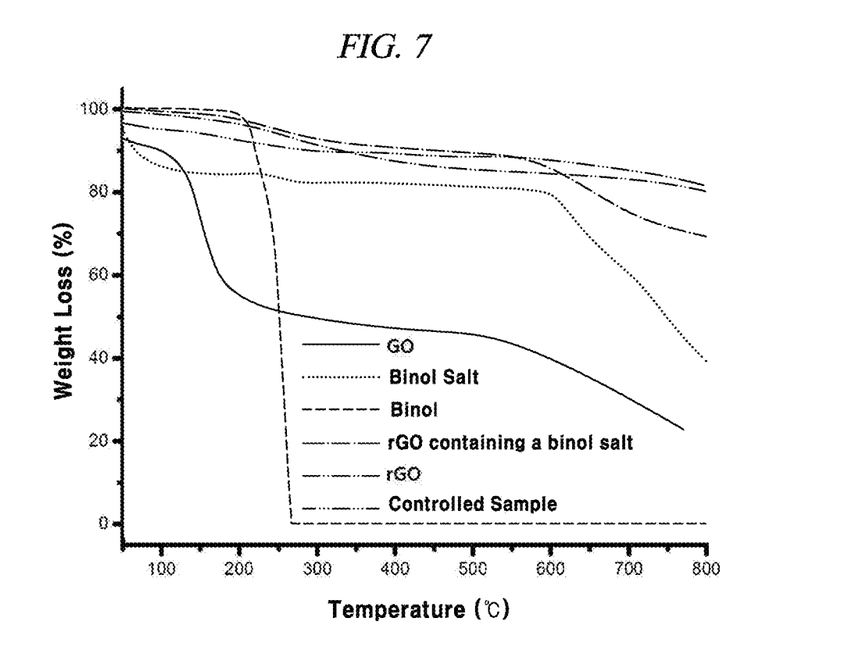
FIG. 7 is a graph illustrating TGA plots for GO (solid line) produced in accordance with an example of a method producing graphene, a binol salt (first dotted line), binol (second dotted line), rGO containing a binol salt (third dotted line), rGO (fourth dotted line), and a controlled sample of rGO (fifth dotted line).
Figure 8:
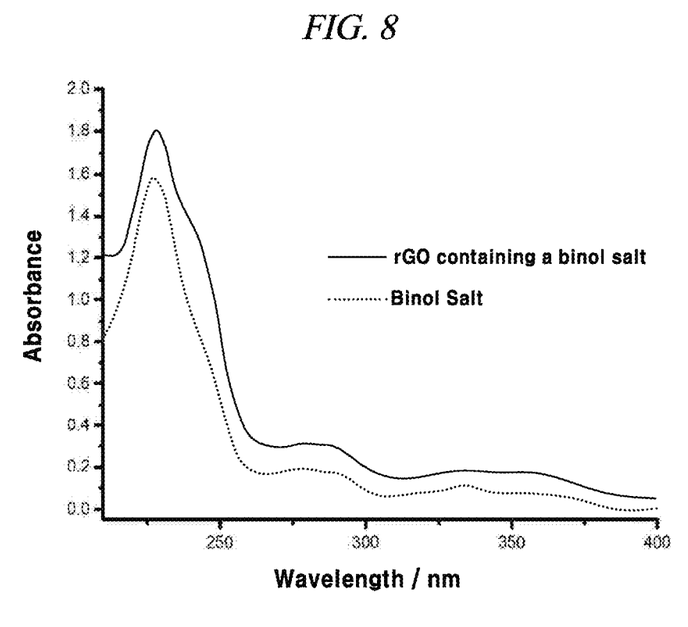
FIG. 8 is a graph illustrating a UV-vis spectrum of rGO (0.04 mg/mL) containing a binol salt and a binol salt (0.025 mg/mL), which were produced in accordance with an example of a method of producing graphene.
Figure 9A:
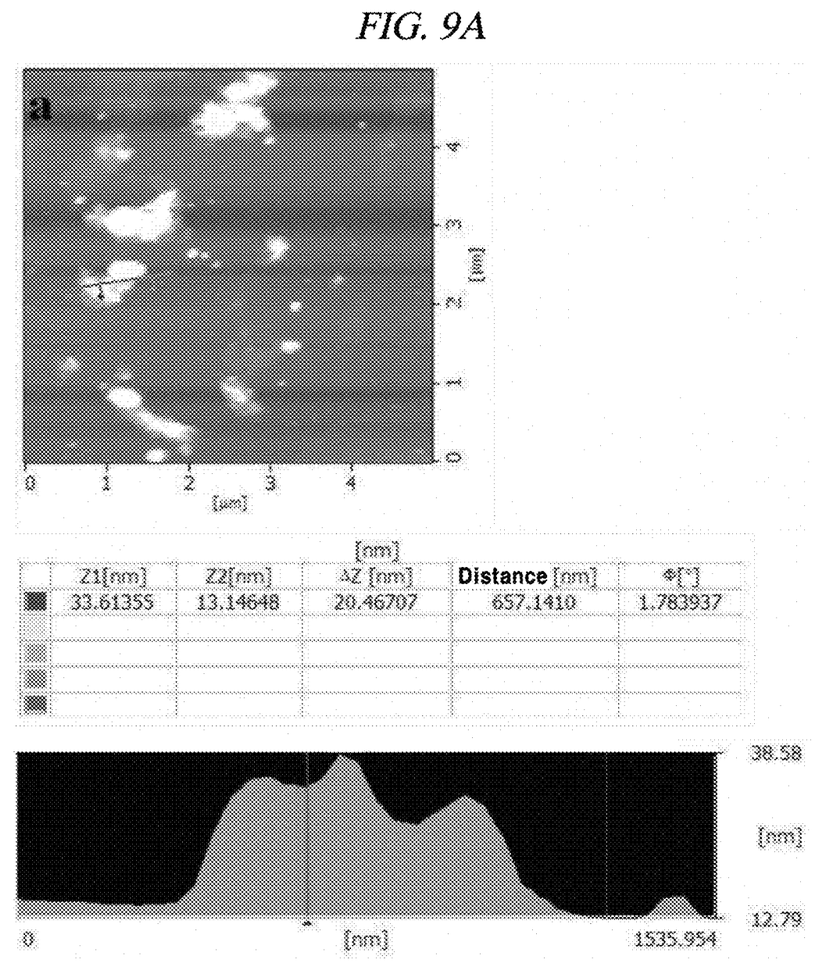
FIG. 9A is an AFM image of rGO (thickness: 20 nm) containing a binol salt produced in accordance with an example of a method of producing graphene.
Figure 9B:
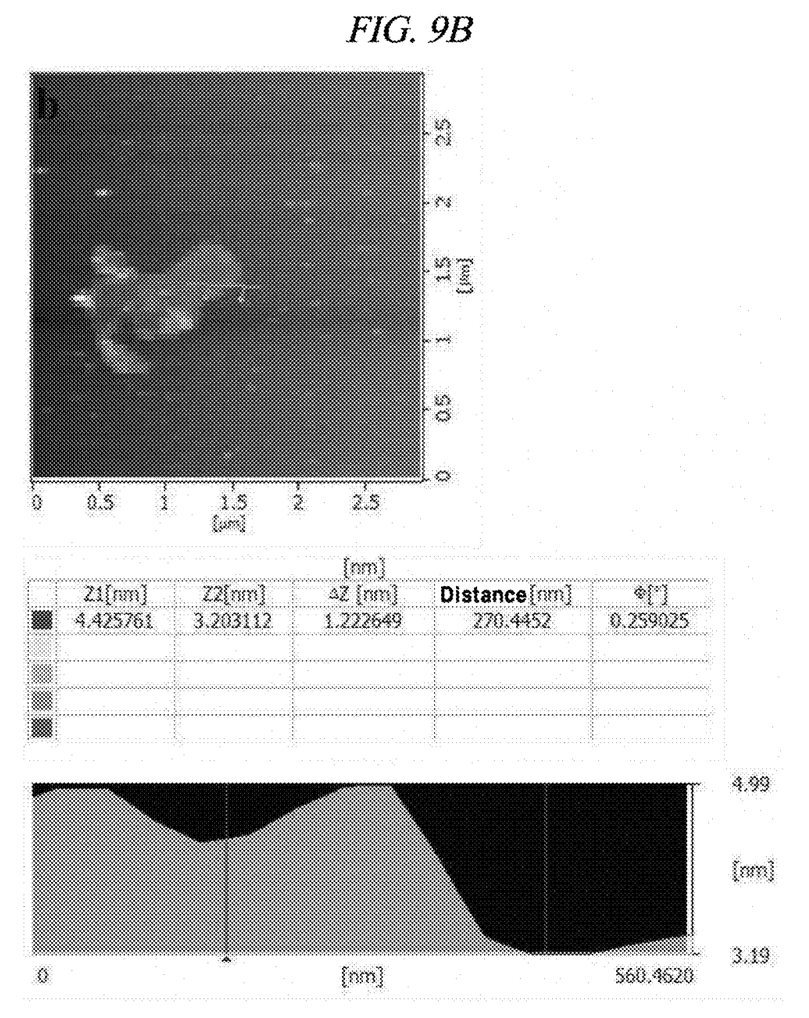
FIG. 9B is an AFM image of rGO (thickness: 1.2 nm) containing a binol salt produced in accordance with an example of a method of producing graphene.
Figure 10:
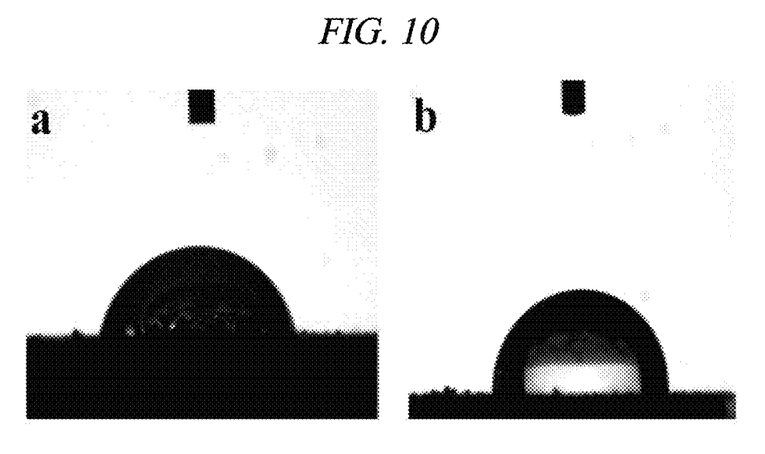
FIG. 10 includes images showing (a) a contact angle (73°) of rGO containing a binol salt produced in accordance with an example of a method producing graphene, and (b) a contact angle (86°) of rGO.

Thermogravimetric analysis (TGA) was used to evaluate the quality of the rGO and identify the presence of the binol salt. FIG. 7 shows TGA plots for the GO (red), the rGO containing the binol salt (blue), the rGO (blue-green), the binol (black), the binol salt (purple) and the controlled sample (green). According to FIG. 7, the rGO had better thermal stability than that of the GO. All the samples were heated under the nitrogen atmosphere from the room temperature to 800° C. at a heating rate of 1° C./min. The GO lost most of its weight between 100° C. and 200° C., which implies that CO, $CO_2$, and steam were discharged from the most unstable functional group during the thermal decomposition. At a temperature of below 800° C., total weight loss was approximately 77%. The weight losses of the rGO containing the binol salt and the rGO were 34% and 16.8%, respectively. The main weight losses of the rGO containing the binol salt occurred at approximately 600° C., which is similar to the binol salt that had the maximum weight loss at 600° C. The TGA results showed the rGO sample containing the binol salt apparently contained the binol salt. Binol is thermally volatile, and the weight loss thereof occurred between 200° C. to 300° C. The controlled sample exhibited a weight loss of approximately 16.2%, which is similar to the rGO sample. This result showed that the rGO contained no binol salt, and the rGO sample exhibited significantly high thermal stability. The weight loss of the rGO was mostly a result of the non-presence of the oxygen functional group. In the UV-vis spectrum, a main absorption peak of the rGO containing the binol salt appeared at 228.6 nm, which red shifted by 1.3 nm, compared to the absorption peak of the binol salt (FIG. 8). This is a result of the weak π-π interaction between the graphene sheet and the binol salt. The AFM image (FIG. 9A) of the rGO containing the binol salt showed that an average thickness of the rGO layer is 2.4 nm to 30 nm, which indicates that the binol salt exists within the graphene sheet. After the complete removal of the binol salt, the thickness of the thinnest film of the rGO was approximately 1.2 nm (two layers) (FIG. 9B), which indicates the complete removal of the binol salt. The number of the rGO layers is mostly 8 to 10 or more. In addition, by drop casting the product on a $SiO_2$ substrate, the rGO pellet containing the binol salt was produced. Due to the presence of the binol salt within the rGO pellet, the thickness of the pellet was approximately 20 μm, and the sheet resistance was 450 Ω/sq. However, after washing the $SiO_2$ substrate coated with the rGO pellet containing the binol salt by using water and an organic solvent and vacuum drying the substrate, the thickness and the sheet resistance of the produced rGO pellet were 10 μm and 40 Ω/sq, respectively. Since the binol salt was completely removed, the sheet resistance was decreased, compared to the rGO pellet containing the binol salt. In addition, a controlled experiment was carried out by using previously known poly(sodium-4-styrenesulfonate (PSS), sodium dodecylbenzene sulfonate (SDBS), and tetrasodium 1,3,6,8-pyrenetetrasulfonic acid (TPA) surfactants. The thickness and the sheet resistance of the rGO pellets using the PSS, the SDBS, and the TPA were approximately 16 μm and 410 Ω/sq; approximately 12 μm and 635 Ω/sq; and approximately 15 μm and 489 Ω/sq, respectively, which were almost the same before and after the washing. In addition, as hydrophobicity increases due to the complete removal of the binol salt, there was a rapid change at a water droplet contact angle (86°, image b of FIG. 10), compared to the water droplet contact angle (73°, image a of FIG. 10) of the rGO containing the binol salt, which supports the result of the present Examples (FIG. 10).

Figure 11:
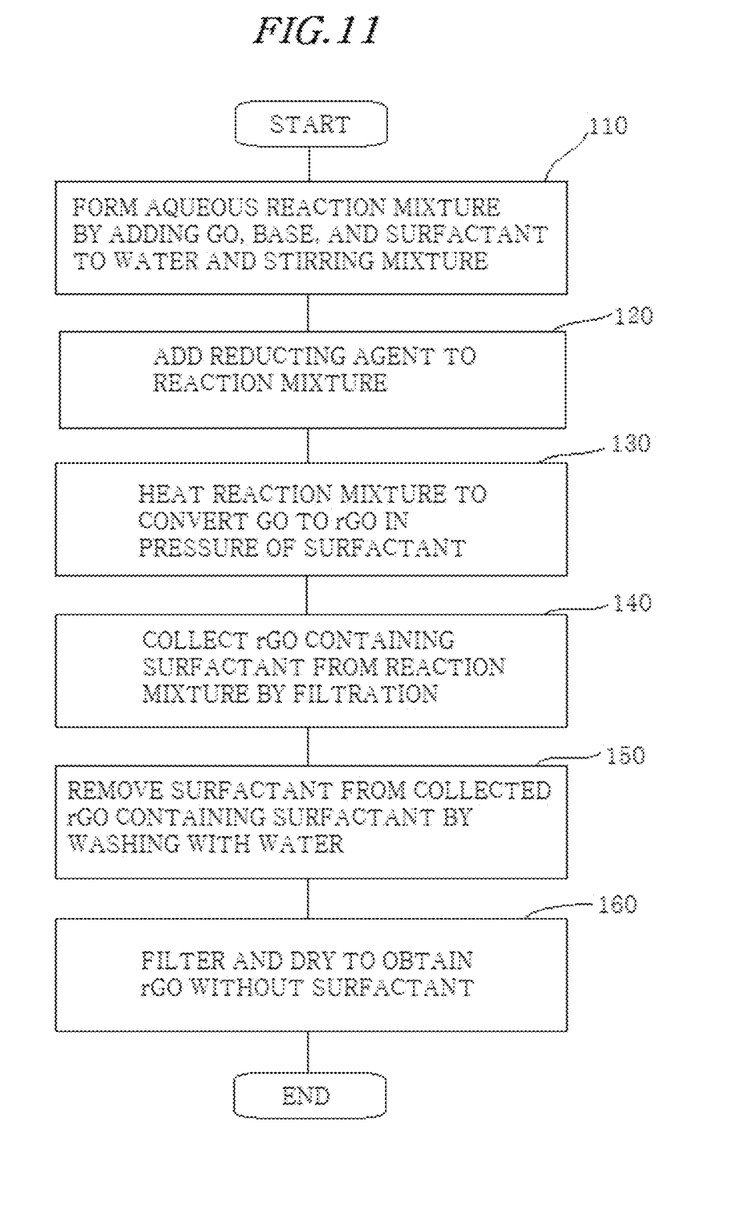
FIG. 11 is a flow diagram illustrating an example of a method of preparing graphene.

FIG. 11 is a flow diagram illustrating an example of a method of preparing graphene. The method is provided as an illustrative example, and the present disclosure is not limited thereto. Referring to FIG. 11, in 110, an aqueous reaction mixture is formed by adding GO, a base and a surfactant to water and by stirring the mixture. The base may be a Lewis base. In one example, the base is NaOH or other strong base. In 120, a reducing agent is added to reaction mixture. For example, the reducing agent may be a hydrazine. In another example, the base added in 110 may serve as the reducing agent, in which event the addition of a separate reducing agent is not necessary.

In 130, the reaction mixture is heated to convert GO to rGO in presence of the surfactant. For example, the aqueous reaction mixture may be prepared at a room temperature, or a temperature between 0 to 30° C., or between 5 to 15° C. The reaction mixture may be then heated to a temperature of 30° C. or greater, 40° C. or greater, 50° C. or greater, 70° C. or greater, or between 70° C. to approximately 100° C., as an example. However, the temperature of the reaction mixture is not limited thereto. The reaction mixture may be heated to complete the reduction of the GO to rGO, or for approximately 30 minutes, or between 20-60 minutes. However, the duration of the heating is not limited thereto.

In 140, rGO containing surfactant is collected from reaction mixture. For example, the rGO containing surfactant may be collected by filtration from the reaction mixture. The rGO containing surfactant may have a layered structure in which a layer of surfactant spaces apart reduced graphene sheets by being absorbed onto the surface of the reduced graphene sheets.

In 150, the surfactant is removed from the collected rGO containing surfactant by washing with a solvent. For example, the collected rGO containing surfactant may include binol salt. In the event that the base used is NaOH and binol was used as the surfactant, sodium salt of binol may be removed from the rGO sample by re-dispersing the collected sample in water and filtering the rGO. The filtrate may be washed with water and organic solvents such as ethanol, acetone, other alcohols and ketone or solvents suitable for removing the surfactant.

In 160, the rGO is collected without the surfactant by filter and drying to the rGO after washing the collected rGO to remove the surfactant. In one example, the filtrate may be dried in a vacuum chamber or oven at an elevated temperature between 50° C. and 100° C. for 6 hours or more. However, the drying condition is not limited thereto.

In accordance with the above-described examples, the graphene sheet produced from graphene oxide (GO) can be non-sharing functionalized under the presence of the surfactant according to one example embodiment, and the resulting reduced graphene oxide (rGO) containing the surfactant can be stably dispersed in water. The rGO containing the surfactant can exhibit a long interlayer distance as observed by using X-ray diffraction analysis (XRD). The surfactant may be completely removed through repeatedly washing the collected rGO by using a solvent without affecting the graphene characteristics.

In accordance with one example embodiment, the rGO can be produced by using a surfactant that may be completely removed, without affecting the graphene characteristics.

In addition, by expanding an example of the method described above, the rGO stably dispersed within an organic solvent can be obtained. Accordingly, it is possible to easily produce the rGO nanosheet, which is dispersed in an organic solvent as well as water, in large quantities. By preparing the rGO, which has the long interlayer distance, and from which the surfactant has been removed, non-sharing functionalized graphene can be effectively used in manufacturing flexible electrodes, biosensors, and hydrogen storage devices.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

I claim:

1. A method of producing reduced graphene oxide, the method comprising:
    forming a graphene oxide-dispersed solution comprising graphene oxide and a surfactant that comprises at least two aromatic functional groups;
    reducing the graphene oxide-dispersed solution to obtain a layered structure of reduced graphene oxide comprising the at least two aromatic functional groups; and
    dispersing the layered structure of reduced graphene oxide in a solvent to produce a multi-layered reduced graphene oxide.

2. The method of claim 1,
    wherein the at least two aromatic functional groups each comprise a member selected from the group consisting of a naphthyl group, an anthracenyl group, a pyrenyl group, a tetrahydropyrenyl group and combinations thereof.

3. The method of claim 1,
    wherein the surfactant comprises a 1,1'-bi-2-naphthol, a binol salt or a binol derivative.

4. The method of claim 1,
    wherein the reducing of the graphene oxide-dispersed solution is performed by adding a reducing agent to the graphene oxide-dispersed solution.

5. The method of claim 4,
    wherein the reducing agent comprises a member selected from the group consisting of sodium hydroxide, calcium hydroxide, ammonium hydroxide, sodium borohydride, hydrazine, hydrogen iodide, hydrogen sulfide, dimethyl hydrazine, hydroquinone, sulfuric acid, aluminum powder and combinations thereof.

6. The method of claim 1, further comprising:
after the dispersing of the layered structure of reduced graphene oxide in the solvent, washing and drying the layered structure of reduced graphene oxide by using an aqueous solvent, an organic solvent or a combination thereof.

7. The method of claim 6,
wherein the organic solvent comprises a member selected from the group consisting of acetone, methylethylketone, methyl alcohol, ethyl alcohol, isopropyl alcohol, butyl alcohol, ethylene glycol, poly ethylene glycol, tetrahydrofuran, dimethyl sulfoxide, dimethyl formamide, dimethyl acetamide, N-methyl pyrrolidone, hexane, cyclohexane, toluene, xylene, chloroform, dichlorobenzene, dimethylbenzene, trimethylbenzene, pyridine, methylnaphthalene, nitromethane, dichloromethane, acetonitrile, octadecylamine, aniline and combinations thereof.

8. A method of producing reduced graphene oxide, the method comprising:
forming a reaction mixture comprising graphene oxide, a reducing agent and a surfactant comprising at least two aromatic functional groups in its molecular structure;
reducing the graphene oxide dispersed in the reaction mixture to obtain reduced graphene oxide comprising the surfactant;
removing the surfactant from the obtained reduced graphene oxide to obtain a multi-layered reduced graphene oxide.

9. The method of claim 8,
wherein the surfactant comprises a member selected from the group consisting of a naphthyl group, an anthracenyl group, a pyrenyl group, a tetrahydropyrenyl group and combinations thereof in its molecular structure.

10. The method of claim 8,
wherein the surfactant comprises a 1,1'-bi-2-naphthol, a binol salt or a binol derivative.

11. The method of claim 8,
wherein the reducing of the graphene oxide comprises adding a reducing agent to the reaction mixture and heating the reaction mixture to a temperature greater than 40° C.

12. The method of claim 11,
wherein the reducing agent comprises a member selected from the group consisting of sodium hydroxide, calcium hydroxide, ammonium hydroxide, sodium borohydride, hydrazine, hydrogen iodide, hydrogen sulfide, dimethyl hydrazine, hydroquinone, sulfuric acid, aluminum powder and combinations thereof.

13. The method of claim 8, wherein the removing of the surfactant comprises dispersing a layered structure of reduced graphene oxide comprising the surfactant in an aqueous solvent, washing and drying the layered structure of reduced graphene oxide to remove the surfactant.

14. The method of claim 13, wherein the layered reduced graphene oxide comprising the surfactant has an average interlayer distance between 13 to 15 Å before the removing of the surfactant.

15. The method of claim 13,
wherein the washing is performed using a solvent comprising a member selected from the group consisting of acetone, methylethylketone, methyl alcohol, ethyl alcohol, isopropyl alcohol, butyl alcohol, ethylene glycol, poly ethylene glycol, tetrahydrofuran, dimethyl sulfoxide, dimethyl formamide, dimethyl acetamide, N-methyl pyrrolidone, hexane, cyclohexane, toluene, xylene, chloroform, dichlorobenzene, dimethylbenzene, trimethylbenzene, pyridine, methylnaphthalene, nitromethane, dichloromethane, acetonitrile, octadecylamine, aniline and combinations thereof.

16. The method of claim 8, wherein the multi-layered reduced graphene oxide has a C/O ratio of 13 or greater and an average interlayer distance between 3 to 4 Å.

* * * * *